United States Patent [19]

Mansoor et al.

[11] Patent Number: 4,944,540
[45] Date of Patent: Jul. 31, 1990

[54] SLIDING RADIATOR GRILL

[75] Inventors: Dhafer Y. Mansoor, West Bloomfield; Arnold O. Pohto, Livonia, both of Mich.

[73] Assignee: Ford Motor Company, Dearborn, Mich.

[21] Appl. No.: 356,082

[22] Filed: May 24, 1989

[51] Int. Cl.⁵ .............................................. B60R 19/02
[52] U.S. Cl. .................................... 293/115; 180/68.6
[58] Field of Search .............. 293/115, 132, 134, 135, 293/136, 137; 180/68.6

[56] References Cited

U.S. PATENT DOCUMENTS

| | | | |
|---|---|---|---|
| 1,871,331 | 8/1932 | Masury | 293/115 |
| 2,578,068 | 11/1951 | Johnson | 293/63 |
| 3,749,436 | 7/1973 | Hitchcock | 293/73 |
| 3,792,889 | 2/1974 | Fuener et al. | 293/63 |
| 4,372,595 | 8/1983 | Roberts | 293/131 |
| 4,753,468 | 6/1988 | Szymczak et al. | 293/132 |
| 4,834,436 | 5/1989 | Nguyen | 293/115 |

*Primary Examiner*—Robert R. Song
*Attorney, Agent, or Firm*—Daniel M. Stock; Roger L. May

[57] ABSTRACT

A movable grill assembly for an automotive vehicle is provided in which a slidable connection is operatively positioned between portions of the grill assembly to permit movement of the grill upon imposition of a load from the vehicle's bumper during impact situations. A stable mounting is provided through pin and slot connections which provide for mounting and grill assembly in stable fashion in its assembled position and for resisting twisting or tilting moments under influence of bumper movement.

16 Claims, 4 Drawing Sheets

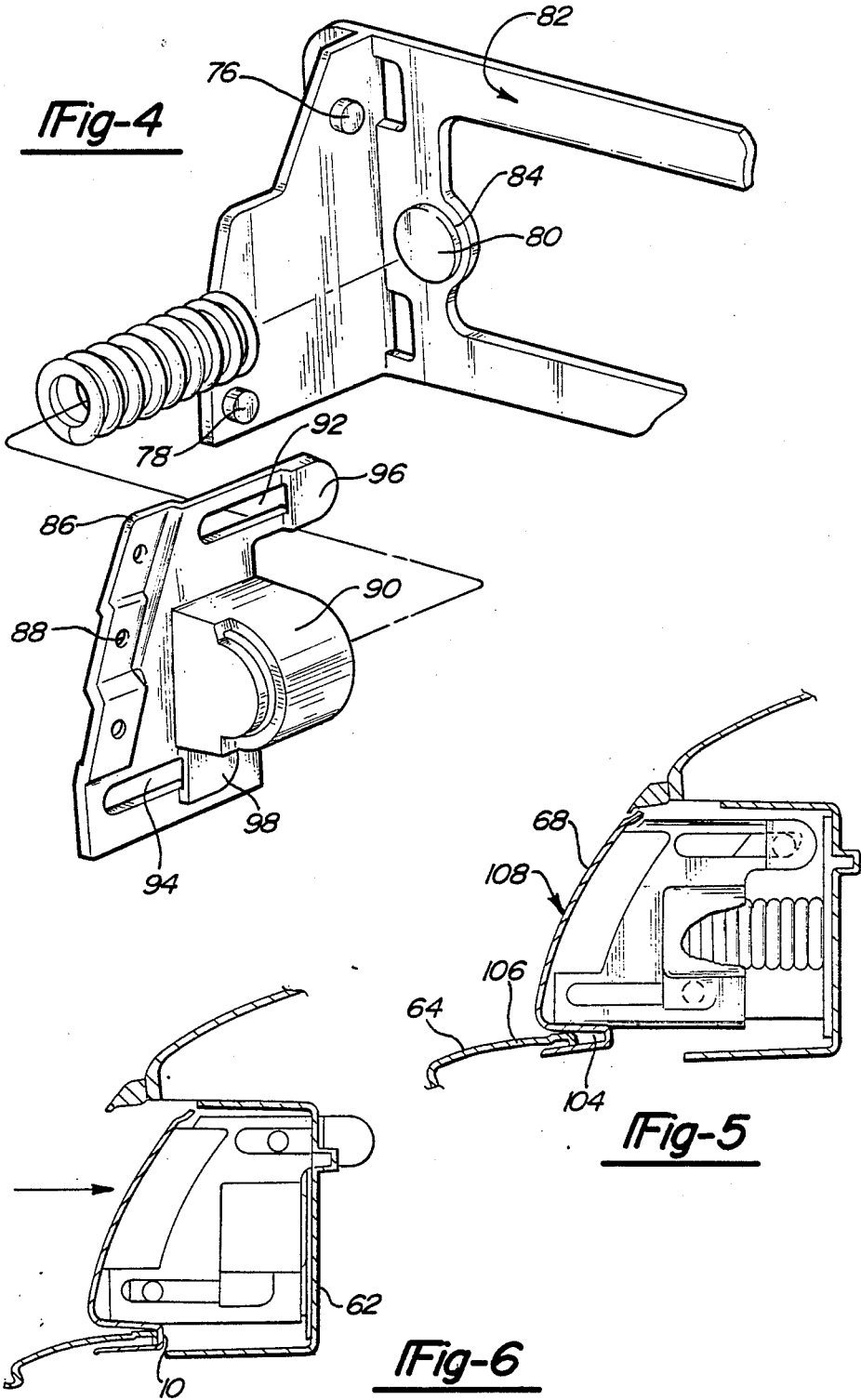

SLIDING RADIATOR GRILL

BACKGROUND OF THE INVENTION

The present invention relates generally to automotive vehicle grills, and more specifically to such grills movably positioned adjacent energy absorbing vehicle bumpers.

DESCRIPTION OF THE PRIOR ART

To increase the resistance to damage of modern automobiles and to enhance the management of the energy that they must absorb during impacts occurring during low closing speed impact conditions, the automotive industry provides vehicles with energy absorbing bumpers which substantially deflect or move axially with respect to the vehicle upon impact. Since the radiator grill of the automobile is positioned rearwardly adjacent such an energy absorbing front bumper, design steps must be taken to ensure that the deflection or movement of the bumper does not create unacceptable damage to the grill. In some automobile designs, it is possible to position the grill sufficiently rearwardly of the front bumper so that there is little probability of contact between the bumper and the grill through the entire range of planned movement of the bumper in its energy absorbing mode. Space constraints and styling considerations can make this approach unacceptable, however, and an alternative approach has been to provide a grill that is mounted in a manner that permits its undamaged movement upon contact with the rearwardly deflecting or moving bumper. One such movable grill design is shown in Fuener U.S. Pat. No. 3,792,889. Another is that shown in co-pending U.S.S.N. No. 120,048 to Nguyen, assigned to the Assignee of the present invention. In both of these and in other prior art designs, the movement of the grill is permitted through some pivotal connection between a grill and stationary automotive body structure. In certain applications, the dependence for lateral stability upon the strength of the pivotal connection between the grill and the body can present a disadvantage in designing relatively massive pivotal mounting structure accommodating a restoring spring load tending to pivot the grill back to its original position. Also disadvantageous is the design constraint imposed by the pivotally mounted designs resulting from the required arcuate movement of the vertically extending grills.

SUMMARY OF THE INVENTION

Responsive to the disadvantages of the prior art movable grill designs, it is an object of the present invention to provide a movable grill assembly for an automobile that provides substantial lateral support of the movable grill.

It is another object of the present invention to provide such a movable grill assembly which can be urged to its normal position through a simple non-pivotally applied preload.

According to one feature of the present invention, a movable grill assembly is provided with a mutually slidable connection between the grill and stationary automotive body structure.

According to another feature of the present invention, such a grill assembly is provided with a substantially linearly actuating resilient member operatively disposed between the body and the grill assembly urging it towards its normal design position.

According to yet another feature of the present invention, the mutually slidable connection between the automotive body and the grill may be configured for controlled movement of the grill with the automobile's energy absorbing bumper to effect both horizontal and vertical movement of the grill corresponding to movement of the bumper.

BRIEF DESCRIPTION OF THE DRAWINGS

These and other objects and features will become apparent to those skilled in the automotive body arts upon reading the following description with reference to the accompanying drawings in which:

FIG. 4 is an exploded view of the alternative embodiment of FIG. 3;

FIG. 5 is a cross-sectional view of the grill assembly of FIGS. 3 and 4 shown in its design assembled position;

FIG. 6 is a cross-sectional view similar to FIG. 5 showing the grill assembly moved in response to impact.

DESCRIPTION OF THE PREFERRED EMBODIMENTS

Figure 1:
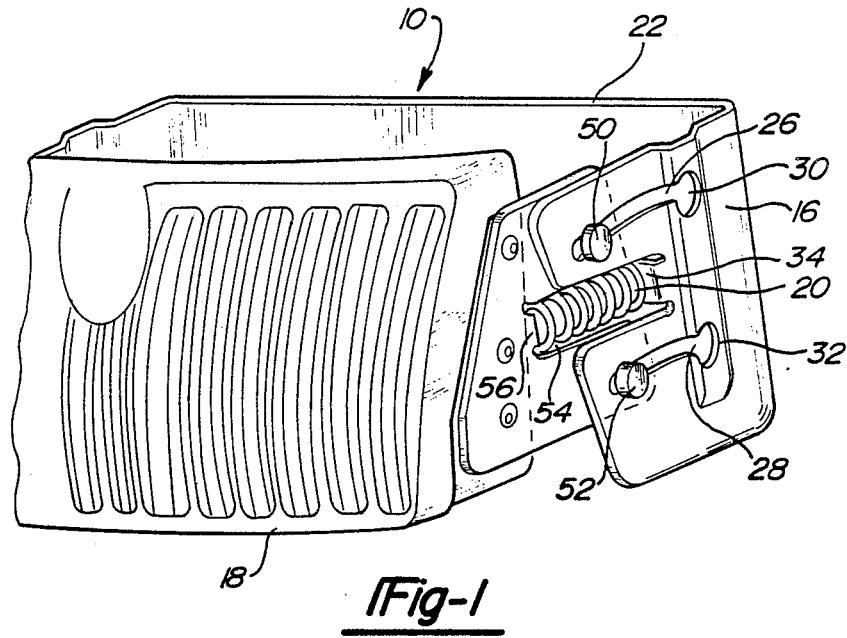
FIG. 1 is a perspective view of the grill assembly according to the present invention, one symmetrical half shown for clarity of presentation.
Figure 3:
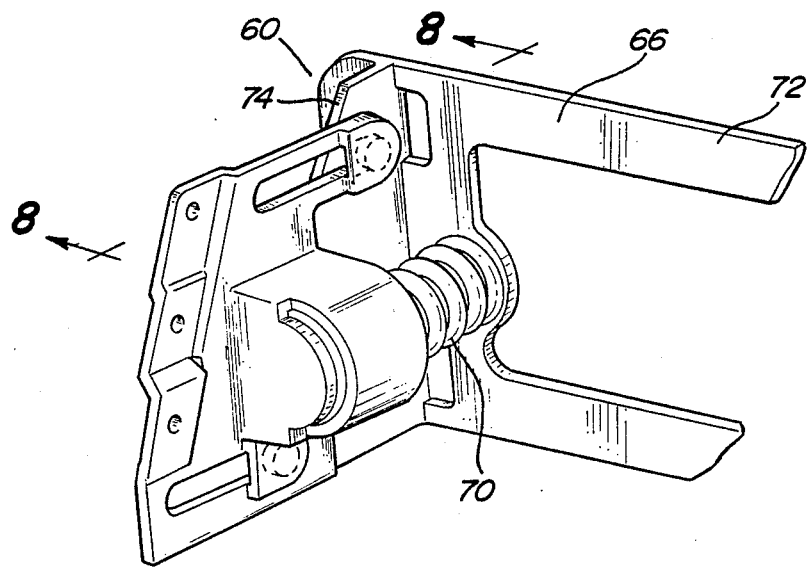
FIG. 3 is a perspective view of an alternative embodiment of the grill assembly of the present invention.
Figure 2:
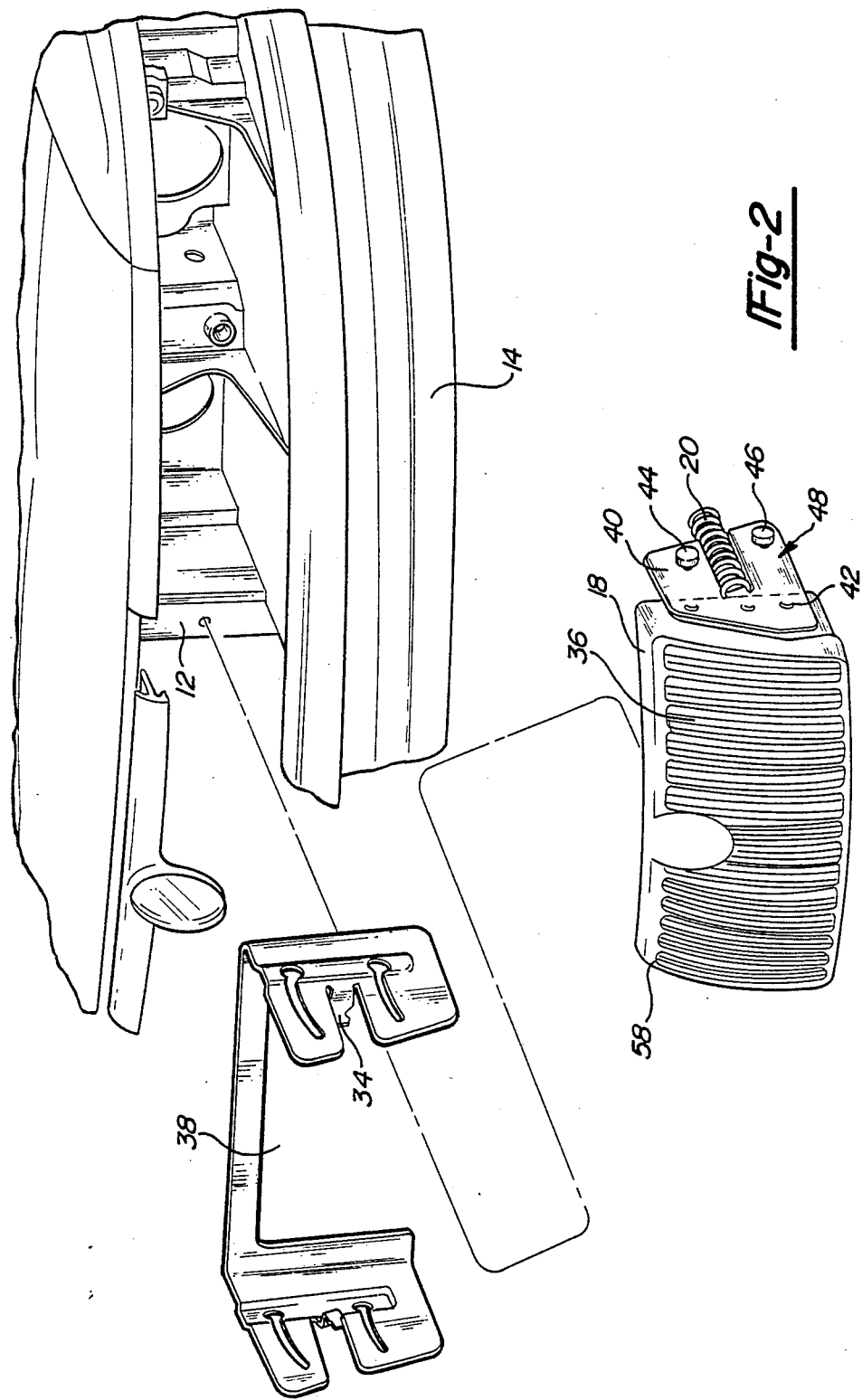
FIG. 2 is an exploded view showing the installation of the grill assembly according to the present invention on the body of an automotive vehicle.

Turning now to the drawings, and in particular to FIGS. 1 and 2 thereof, a movable grill assembly 10 is configured to be fixedly secured to an automotive vehicle body 12 rearwardly adjacent bumper 14. It is to be understood that the bumper 14 is of the energy absorbing type being horizontally movable or deflectable rearwardly upon imposition of a certain impact load at the front of the bumper. Such bumper designs are well known in the automotive body arts and no further description is deemed necessary.

The movable grill assembly 10 comprises a bracket 16, a styled grill 18 and at least one return spring 20. The bracket 16 is preferably formed as a generally U-shaped member having a flat base portion 22 and a pair of laterally spaced side portions 24 extending perpendicularly from the base portion. Each of the side portions includes a pair of vertically spaced slots 26, 28 extending generally in a horizontal direction when the base portion 22 is secured to the body 12 in a vertical orientation. It will be noted that in the showing of FIGS. 1 and 2, the slots 26, 28 have an arcuate concave downward configuration. Such configuration can be chosen to control movement of the grill 18 upwardly as it moves rearwardly responsive to movement of the bumper 14. Other slot configurations may be chosen, however, to define other paths of controlled movement of the grill 18. The slots 26, 28 are also illustrated as including enlarged end portions 30, 32, respectively. The side portions 24 are further illustrated as including a struck-out L-shaped portion 34 sized to be received with and retain the spring 20. The grill 18 is illustrated as being formed of generally rectangular configuration having a plurality of generally vertically extending slots 36 arrayed across its frontal surface partly in registration with a substantial opening 38 formed through the base 22 of the bracket 16. A pair of mounting plates 40, one shown, are secured in laterally spaced fashion through conventional fasteners, as indicated at 42 to opposite lateral sides of the grill 18. A pair of vertically spaced pins 44, 46 each projects from the outer face 48 of each mounting plate 40, each pin having an enlarged head portion 50, 52 respectively sized to be inserted through the enlarged slot portions 30, 32 of bracket side portions 24. A central slot 54 is formed in each mounting plate 40 for receiving the spring 20, the slot 54 terminating in a central upstanding spring seat 56 for receiving and retaining one end of the spring 20, which is illustrated as comprising a simple helical compression spring.

As can best be seen in FIG. 2, the movable grill assembly 10 of the present invention may be assembled as a self-contained assembly shown in FIG. 1 with the pins 44, 46 of the grill mounting plates 40 slidably engaged in the slots 26, 28 and urged toward a forward design position with respect to the automotive body 12 by operation of the spring 20. Assembly into the vehicle may accordingly be simply and effectively accomplished through presenting the rear face of the base portion 22 of the bracket 16 to the vehicle body 12 and securing it thereto through agency of conventional fasteners (not shown). After final assembly of bumper 14 on the automotive bodY 12, any rearwardly directed impact on the bumper 14 causing it to contact the front face 58 of the grill 18 will urge the grill 18 toward the body 12, its movement being controlled by the sliding cooperation between the pins 44, 46 of mounting plates 40 and the slots 26, 28 of the bracket 16. For low energy impacts, generally those occurring at closing speeds of less than 5 mph, release of the impact load will allow the bumper 14 to return to its original position and the spring 20, which is compressed during the movement of the grill 18 toward the body 12, will operate to return the grill 18 to its forward design position.

Turning now to FIGS. 3–6, an alternative embodiment of the grill assembly of the present invention is shown which is particularly well adapted in structural configuration for manufacture of most major components of the grill assembly as plastic parts.

Figure 7:
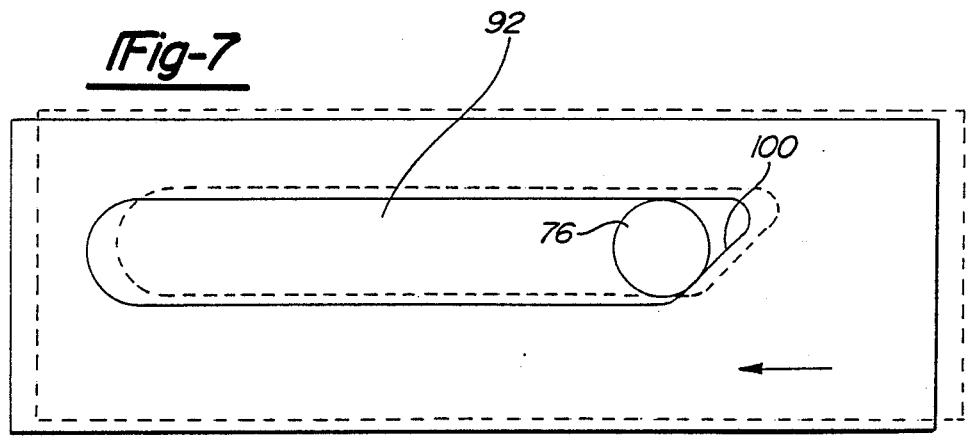
FIG. 7 is an enlarged view of the pin and slot connection of the grill assembly.

The alternative movable grill assembly 60 is likewise arranged to be secured to an automotive body 62 rearwardly adjacent a movable bumper 64 as may best be seen in FIGS. 5 and 6. It comprises a bracket 66 and a grill 68 having a spring 70 operatively carried therebetween. The bracket 66 has a generally flat base portion 72 vertically positioned against the vehicle body 62 and a pair of upstanding laterally spaced side portions 74, one shown. A pair of vertically and horizontally spaced pins 76, 78 project laterally inwardly from the side portions 74 and may be integrally formed therewith. An upstanding post 80 is formed on the inner face 82 of the bracket base portion 72 for radially retaining the spring 70. An annular surface 84 surrounds the post 80 providing a seat for the spring 70. A mounting plate 86 is secured to each side of the grill 68 and includes adjacent its front edge a plurality of apertures 88 for receiving conventional fasteners for securing the plate 86 to the grill 68. Carried with or formed integrally with the plate 86 is a spring housing 90 for receiving one end of the spring 70, as may best be seen in FIG. 5. Each mounting plate 86 further includes vertically spaced and horizontally staggered upper and lower slots 92, 94 respectively, which in the embodiment illustrated in FIGS. 3–6 extend in a horizontal direction. As has been mentioned above, while a general horizontal projection is generally necessary in view of the generally horizontal movement of bumpers with respect to vehicle bodies, other movement controlling paths may be chosen for the configuration of the slots 92, 94. Each slot is sized to receive the respective pin 76, 78 of the bracket 66 and a cover portion 96, 98 is formed at the end of each slot 92, 94, respectively, and a locking chamfer 100 terminates each slot such as is illustrated in FIG. 7 with respect to the slot 92 in registration with the covers 96, 98.

Figure 8:
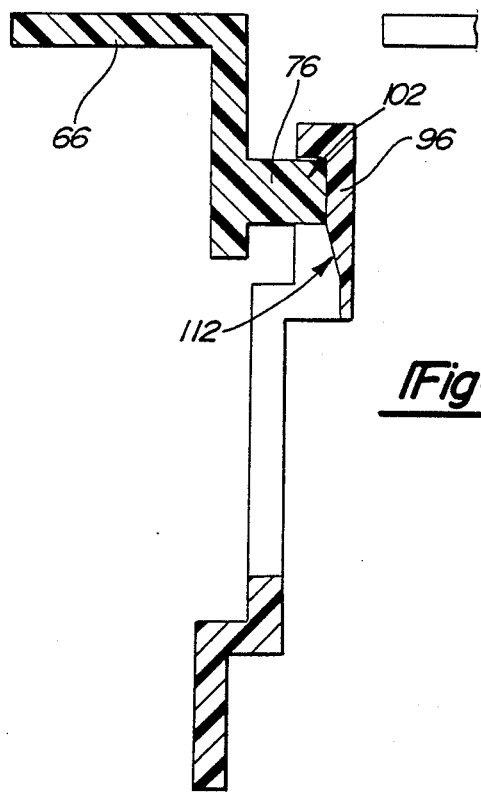
FIG. 8 is a cross-sectional view taken along line 8—8 of FIG. 3.

Turning now to FIGS. 5 and 6, the operation of the grill assembly 60 may be appreciated by reference to the alternatively positioned views there shown. It should be noted that the grill 68 of this embodiment is illustrated as including a lower pocket 104 for receiving an upper surface 106 of the bumper 64 to direct contact of the bumper 64 with the grill 68 to a location remote from the decorative outer surface 108. In the design assembled position of FIG. 5, the spring 70 acting between the bracket 66 and the grill 68 urges the grill 68 outwardly until the pins 76, 78 bottom on the chamfer 100. Provision of this locking chamfer provides a stable assembled position in which pin-to-slot tolerances are compensated for and positive vertical and longitudinal location of the grill 68 is assured owing to the ramped engagement. Lateral stability of the grill assembly is enhanced in this position through provision of the covers 96, 98 overlying the pins 76, 78 as may best be seen in FIG. 8. A line-on-line to slight interference condition may be provided between the outer end of the pins 76, 78 and the inner surface of the covers 96, 98 to assure contact and enhance this lateral stability. The use of certain plastics in construction can provide flexibility to assure this effect. Entrance chamfers 102, 112 may be provided to facilitate engagement of the pins 76, 78 within the covers 96, 98.

Upon imposition of an impact load in the direction of the arrow of FIG. 6, the bumper 64 moves rearwardly with its upper surface 106 engaging at the terminating wall 110 of the pocket 104 to urge the grill 68 rearwardly in sliding engagement of the slots 92, 94 with the pins 76, 78. The longitudinally staggered positioning of the pins and slots enhance the stable movement during this stroking operation by resisting twisting moments on the grill 68 that may be imposed by any tendency of the bumper 64 to move vertically as it moves rearwardly with respect to the body 62. Release of the load permits the return of the grill 68 to the assembled design position of FIG. 5 through operation of the spring 70.

While only two embodiments of the movable grill assembly of the present invention have been described, others may be possible without departing from the scope of the following claims.

We claim:

1. In a motor vehicle having a bumper assembly movable longitudinally of the body of the vehicle between a frontwardly located assembled position and a rearwardly located impact position in response to the imposition of an impact load on the bumper, and a movable grill assembly mounted on the vehicle body rearwardly adjacent and in the path of movement of the bumper assembly, an improved mounting arrangement for the movable grill assembly comprising:

a bracket adapted to be fixedly secured to the vehicle body;

means defining a longitudinally extending pin and slot connection between the grill and the bracket to permit controlled movement of the grill between the assembled and impact positions; and spring means operatively engaged between the grill and the bracket to urge the grill toward the assembled position.

2. A mounting arrangement as defined in claim 1 wherein the pin and slot connection means comprises a curvilinearly extending slot-formed in concave downward fashion to cause vertical movement of the grill during longitudinal movement thereof from the assembled to the impact positions.

3. A mounting arrangement as defined in claim 1 wherein the bracket comprises:

a flat, vertically positioned base portion;

a pair of laterally spaced side portions extending forwardly therefrom; and wherein said means to permit controlled movement comprises a mounting plate which is secured to each side of the grill for insertion between the bracket side portions and the pin and slot connection is operatively disposed between the mounting plates and the bracket side portions.

4. A mounting arrangement as defined in claim 3 wherein a locking chamfer is provided at the end of the pin and slot connection for receiving the pin when the grill assembly is in the assembled position.

5. A mounting arrangement as defined in claim 3 wherein the means for defining a pin and slot connection comprises a curvilinearly extending slot formed in concave downward fashion to cause vertical movement of the grill during longitudinal movement thereof from the assembled to the impact positions.

6. A mounting arrangement as defined in claim 3 wherein the bracket includes means defining a pair of vertically spaced longitudinally extending slots through the side portions and the mounting plates include a pair of vertically spaced pins projecting into slidable engagement in the pair of bracket side portion slots.

7. A mounting arrangement as defined in claim 6 wherein a locking chamfer is provided at the end of at least one of the slots for receiving the corresponding pin when the grill assembly is in the assembled position.

8. A mounting arrangement as defined in claim 6 wherein the bracket includes means defining a cover overlying the end of each of the slots corresponding to the position of the pins with respect to the slots when the grill assembly is in the assembled position.

9. A mounting arrangement as defined in claim 7 wherein the bracket includes means defining a cover overlying end of each of the slots corresponding to the position on of the pins with respect to the slots when the grill assembly is in the assembled position.

10. A mounting arrangement as defined in claim 6 wherein the mounting plate pins include an enlarged head portion for resisting removal of the mounting plate pins from the bracket side portion slots in the lateral direction.

11. A mounting arrangement as defined in claim 6 wherein the mounting plate pins are longitudinally offset from each other whereby the resistance of the mounting arrangement to pivotal movement about axes perpendicular to the vertical longitudinal plane of the vehicle is enhanced.

12. A mounting arrangement as defined in claim 11 wherein the bracket includes means defining a cover overlying the end of each of the slots corresponding to the position of the pins with respect to the slots when the grill assembly is in the assembled position.

13. In a motor vehicle having a bumper assembly movable longitudinally of the body of the vehicle between a frontwardly located assembled position and a rearwardly located impact position in response to the imposition of an impact load on the bumper, and a movable grill assembly mounted on the vehicle body rearwardly adjacent and in the path of movement of the bumper assembly, an improved mounting arrangement for the movable grill assembly comprising:

a bracket adapted to be fixedly secured to the vehicle body;

means defining a mutually longitudinally slidable connection between the grill and the bracket to permit controlled movement of the grill between the assembled and impact positions; and spring means operatively engaged between the grill and the bracket to urge the grill toward the assembled position.

14. A mounting arrangement as defined in claim 13 wherein the means defining a slidable connection comprises a longitudinally extending pin and slot connection.

15. A mounting arrangement as defined in claim 14 wherein a locking chamfer is provided at the end of the pin and slot connection for receiving the pin when the grill assembly is in the assembled position.

16. A mounting arrangement as defined in claim 13 wherein the bracket comprises:

a flat, vertically positioned base portion;

a pair of laterally spaced side portions extending forwardly therefrom; and wherein a mounting plate is secured to each side of the grill for insertion between the bracket side portions and the pin and slot connection is operatively disposed between the mounting plates and the bracket side portions.

* * * * *